United States Patent [19]

Klang et al.

[11] Patent Number: 5,380,597
[45] Date of Patent: Jan. 10, 1995

[54] POLYVINYL ACETAL RESINS BASED ON HYDROXYALDEHYDES AND USE OF THE RESINS IN LAMINAR STRUCTURES

[75] Inventors: Jeffrey A. Klang, Exton; Michael J. Cannarsa, West Chester; Frank J. Liotta, Jr., Collegeville, all of Pa.; Scott E. Smyth, Riverton, N.J.

[73] Assignee: Arco Chemical Technology L.P., Greenville, Del.

[21] Appl. No.: 237,560

[22] Filed: May 3, 1994

Related U.S. Application Data

[62] Division of Ser. No. 963,298, Oct. 16, 1992, Pat. No. 5,332,774.

[51] Int. Cl.⁶ .............................................. C08L 29/04
[52] U.S. Cl. .................................. 428/441; 524/377; 524/378; 524/385; 524/386; 524/388; 525/56; 525/58; 525/61
[58] Field of Search ............... 428/441; 524/377, 378, 524/385, 386, 388; 525/56, 58, 61

[56] References Cited

U.S. PATENT DOCUMENTS

| | | | |
|---|---|---|---|
| 3,631,225 | 12/1971 | Tenney et al. | 260/874 |
| 3,926,918 | 12/1975 | Shibata et al. | 260/73 L |
| 3,998,792 | 12/1976 | Hermann et al. | 260/73 L |
| 4,205,146 | 5/1980 | Hermann et al. | 525/61 |
| 4,293,615 | 10/1981 | Bowen et al. | 428/412 |
| 4,654,179 | 3/1987 | Cartier et al. | 264/176.1 |
| 4,751,266 | 6/1988 | Hermann et al. | 525/61 |
| 4,940,646 | 7/1990 | Palowski | 430/175 |
| 4,948,672 | 8/1990 | Cartier et al. | 482/424.4 |
| 5,028,658 | 7/1991 | David et al. | 525/58 |
| 5,137,954 | 8/1992 | DasGupta et al. | 524/284 |
| 5,242,779 | 9/1993 | Mueller-Hess et al. | 430/175 |

FOREIGN PATENT DOCUMENTS 32-8470 10/1957 Japan.

OTHER PUBLICATIONS

"Polyvinyl Butyrol, The Interlayer in Laminated Safety Glass", J. A. Snelgrove, *Nihon Setchaker Kyokaishi* vol. 21, No. 11, pp. 489-495 Dec. 1985.

"Poly(vinyl aceful)s" E. Lavin and J. A. Snelgrove, *Kirk-Othmer Encyclopedia of Chemical Technology*, 3rd ed., vol. 23, pp. 798-816 Dec. 1982.

*Primary Examiner*—W. Robinson H. Clark
*Attorney, Agent, or Firm*—Jonathan L. Schuchardt

[57] ABSTRACT

Plasticized polyvinyl acetal resins based on 4-hydroxybutanal are disclosed. Laminar structures that include the resins, a process for making the resins, and a process for making an internally plasticized polyvinyl acetal resin by esterification, are also revealed.

19 Claims, No Drawings

POLYVINYL ACETAL RESINS BASED ON HYDROXYALDEHYDES AND USE OF THE RESINS IN LAMINAR STRUCTURES

This is a division of application Ser. No. 07/963,298, filed on Oct. 16, 1992 now allowed U.S. Pat. No. 5,332,774.

FIELD OF THE INVENTION

The invention relates generally to polyvinyl acetal resins. In particular, the invention relates to plasticized polyvinyl acetal resins derived in part from 4-hydroxybutanal, and the use of these plasticized resins as interlayers for laminar structures.

BACKGROUND OF THE INVENTION

Polyvinyl acetal resins are the reaction products of polyvinyl alcohol and aldehydes. The most common polyvinyl acetal resins are derived from normal aldehydes such as acetaldehyde and n-butyraldehyde. Commercially, the most important polyvinyl acetal resin is polyvinyl butyral, which has been used for decades as an interlayer for automotive safety glass.

Polyvinyl butyral is the resin of choice for safety glass because of its overall balance of superior properties, optical clarity, and low cost. The lack of additional functionality in the aldehyde component, however, is somewhat limiting. It would be desirable for some applications to have primary hydroxyl groups on the acetal resin, groups that could promote interlayer interaction or be chemically modified to achieve other desirable properties.

Aliphatic esters such as dihexyl adipate, dibutyl sebacate, and tetraethylene glycol diheptanoate, are commonly added usually at about 30–40 wt. %) to plasticize polyvinyl butyral. Even distribution of the plasticizer may be difficult to achieve; under various temperature extremes, a plasticizer may tend to phase separate or leach out of the polyvinyl acetal resin. Thus, it is desirable to develop plasticized polyvinyl acetal compositions that resist phase separation. In addition, added plasticizers generally reduce the overall physical properties of the polyvinyl acetal resins.

Surprisingly little is known about polyvinyl acetal resins derived from hydroxy-substituted aldehydes. Pawlowski (U.S. Pat. No. 4,940,646) teaches polyvinyl acetal compositions derived from hydroxy-substituted aldehydes. The products are useful binders for photosensitive compositions. Yoshioka et al. (Japanese Patent Application Kokai No. 32-8470) teach a method for treating synthetic fibers of polyvinyl alcohol with hydroxyaldehydes under acid conditions to make treated fibers having acetal functionality on their surface. Neither reference teaches plasticized polyvinyl acetal compositions useful for laminar structures.

Still needed in the art are polyvinyl acetal resins having improved physical properties. Resins that can be modified chemically to vary properties, and plasticized resins that resist phase separation are also needed.

SUMMARY OF THE INVENTION

Objects of the invention: (1) plasticized polyvinyl acetal resins derived from hydroxy-substituted aldehydes; (2) plasticized polyvinyl acetal resins derived from aqueous mixtures of 4-hydroxybutanal and 3-hydroxy-2-methylpropanal; (3) polyvinyl acetal resins that are internally plasticized, so they require no added plasticizers; (4) laminar structures based on the polyvinyl acetals; (5) polymer blends based on polyvinyl acetal resins; (6) processes for making polyvinyl acetal resins and internally plasticized polyvinyl acetal resins.

The invention is a plasticized polyvinyl acetal composition. The composition comprises a polyvinyl acetal resin derived from 4-hydroxybutanal and a plasticizer. The plasticizer is selected from the group consisting of $C_2$-$C_{30}$ aliphatic mono-, di-, and polyfunctional alcohols, ethers, and glycol ethers; polyoxyalkylene polyols; and ethers derived from polyoxyalkylene polyols.

The invention also includes a laminar structure comprising a first layer of a glazing material, and a second layer of a plasticized polyvinyl acetal resin derived from polyvinyl alcohol and 4-hydroxybutanal. The invention includes laminar structures in which the polyvinyl acetal layer is an interlayer between two pieces of glazing material.

The invention also includes blends of polyvinyl acetals derived from 4-hydroxybutanal with other polymers such as polyurethanes and polyesters, and laminar structures that use the blends.

A process for making a plasticized polyvinyl acetal resin based on 4-hydroxybutanal is included in the invention. Also included is a process for making an esterified polyvinyl acetal. This process comprises reacting a polyvinyl acetal resin based on 4-hydroxybutanal with a carboxylic acid derivative to produce an internally plasticized acetal resin composition.

DETAILED DESCRIPTION OF THE INVENTION

Polyvinyl acetal resins are prepared from the reaction of polyvinyl alcohol and an aldehyde in the presence of an acid catalyst. Any suitable grade of polyvinyl alcohol known to those skilled in the art for making acetal resins can be used. The polyvinyl alcohol can be partially or completely hydrolyzed; preferred polyvinyl alcohol is from about 95 to about 100% hydrolyzed. Polyvinyl alcohol of any desired molecular weight can be used. Preferably, the molecular weight of the polyvinyl alcohol is within the range of about 15,000 to about 200,000. More preferred is the range from about 30,000 to about 150,000.

The polyvinyl acetal resins of the invention include 4-hydroxybutanal as an aldehyde component. Pure 4-hydroxybutanal is suitable for the invention, but is obtained only by laborious and costly methods. An economical source of 4-hydroxybutanal is an aqueous aldehyde stream produced commercially when allyl alcohol is hydroformylated in the presence of a rhodium catalyst. The aqueous stream, which typically contains about 5–20 wt. % aldehydes, is obtained by extracting the hydroformylation reaction mixture with water. The aldehyde mixture contains about a 7:1 molar ratio of 4-hydroxybutanal and 3-hydroxy-2-methylpropanal. In the commercial process, the aldehyde stream is hydrogenated to give 1,4-butanediol and 2-methyl-1,3-propanediol. However, the aqueous aldehyde stream is alternatively and advantageously used for the process and compositions of the present invention. The aqueous aldehyde solution used for the invention can have any desired aldehyde concentration.

Other aldehydes can be used in combination with 4-hydroxybutanal. For example, mixtures of 4-hydroxybutanal and aliphatic or aromatic aldehydes such as acetaldehyde, propionaldehyde, n-butyraldehyde, benzaldehyde, 4-tolualdehyde, benzaldehyde-3-sulfonic acid, and the like, are suitable. Mixtures of 4-hydroxybutanal and n-butyraldehyde are preferred. Preferred polyvinyl co-acetal resin compositions of the invention include n-butyraldehyde and 4-hydroxybutanal in a weight ratio within the range of about 1:1 to about 100:1; a more preferred range is from about 1:1 to about 10:1.

The compositions of the invention include a plasticizer. Conventional polyvinyl butyral for laminating is plasticized with about 30–40 wt. % of an aliphatic ester such as dihexyl adipate, dibutyl sebacate, tetraethylene glycol diheptanoate, or the like. Unfortunately, we found that aliphatic esters are generally unsatisfactory plasticizers for polyvinyl acetal resins derived from 4-hydroxybutanal. When esters are used, glass-transition temperatures of the plasticized products are typically higher than desirable, and the compression-molded films have a marbled appearance and a greasy surface.

We found, quite surprisingly, that the drawbacks of the aliphatic ester plasticizers are overcome by using other compounds that are not known as plasticizers for polyvinyl acetal resins. Plasticizers useful in the present invention include $C_2$–$C_{30}$ aliphatic mono-, di-, and polyfunctional alcohols, ethers, and glycol ethers, and mixtures thereof. Suitable examples include, but are not limited to, propylene glycol, dipropylene glycol, tripropylene glycol, diethylene glycol, tetraethylene glycol, and the like, and mono- and dialkyl ethers derived from these. Also suitable for use as plasticizers for the compositions of the invention are polyoxyalkylene polyols and ethers derived from polyoxyalkylene polyols. Examples include, but are not limited to, polypropylene glycols, polyethylene glycols, copolymers of ethylene oxide and propylene oxide, tetrahydrofuran polymers, and the like, alkyl ethers of these, mixtures thereof. Preferred polyoxyalkylene polyols are epoxide polymers that have number average molecular weights within the range of about 250 to about 10,000; a more preferred range is from about 250 to about 1,000. Tetrahydrofuran polymers having a number average molecular weight less than about 500 are also preferred.

Any desired amount of plasticizer can be used. It is preferred, however, to use an amount within the range of about 5 to about 50 weight percent of plasticizer based on the total weight of plasticized composition. A more preferred range is from about 10 to about 40 weight percent of plasticizer. If desired, a conventional ester plasticizer can be included in the compositions of the invention, provided that a plasticizer of the invention is also used. It is especially desirable to include an ester plasticizer when the aldehyde mixture used contains an aliphatic aldehyde such as n-butyraldehyde in addition to 4-hydroxybutanal.

The plasticized polyvinyl acetal resins of the invention are useful for laminar structures. Laminar structures of the invention comprise a first layer of a glazing material, and a second layer of a plasticized polyvinyl acetal derived from 4-hydroxybutanal. The glazing material is generally a sheet or film of glass or synthetic plastic. Preferred glazing materials include glass, polycarbonate, polyurethane, polyacrylate, polyester, polyamide, polyether, and polyacetal. Preferred glazing materials are essentially transparent. Laminar structures of the invention include structures which comprise two layers of glazing material and an interlayer of the plasticized polyvinyl acetal resin derived from 4-hydroxybutanal. Preferably, the glazing material is glass. The sandwich-type laminar structures having a polyvinyl acetal interlayer are particularly useful for automotive safety glass and similar applications. Any number of layers of alternating glazing material and polyvinyl acetal resin can be used.

The invention also includes blends of 4-hydroxybutanal-based polyvinyl acetal resins with other polymers, including polyurethanes, polyacrylates, polycarbonates, polyesters, polyamides, polyethers, polyvinylpyrrolidones, and polyacetals. Preferred blends are miscible, and give a transparent product. The polymer blend can include a plasticizer as described above for the polyvinyl acetal resins derived from 4-hydroxybutanal. Laminar structures that include these polymer blends as layers are included in the invention. Thus, one embodiment of the invention is a laminar structure comprising two sheets of glass, and an interlayer which comprises a polymer blend of a polyacrylate and a polyvinyl acetal resin derived from 4-hydroxybutanal. Preferably, when the interlayer is a polymer blend, it is a miscible blend. Many other variations on this theme will be apparent to those skilled in the art.

The invention includes a process for making a plasticized polyvinyl acetal resin. The process comprises (1) reacting an aqueous solution that contains 4-hydroxybutanal with polyvinyl alcohol in the presence of an acid catalyst to produce a polyvinyl acetal resin, and (2) combining the polyvinyl acetal resin with a plasticizer of the invention to form the plasticized polyvinyl acetal resin. The acid catalyst is any acidic substance known to catalyze acetalation reactions. Preferred acid catalysts are mineral acids, organic acids, acidic ion-exchange resins, acidic clays, and mixtures thereof.

The reaction of aqueous 4-hydroxybutanal with polyvinyl alcohol can be performed using any of a number of well-known methods. Typically, the polyvinyl alcohol and the acid catalysts are first dissolved in water or suspended in an alcohol at a temperature within the range of about 20°–100° C. Aqueous 4-hydroxybutanal is added slowly, and the mixture is heated. After cooling, water is added to precipitate the product if an alcohol is used. The precipitated product is filtered and washed with water. The product is resuspended in water and neutralized with a base. The product is again filtered, washed with water, and dried. A plasticized product is obtained by combining the polyvinyl acetal resin with an alcohol, adding a plasticizer, and stripping off the alcohol.

The invention also includes a process for making an esterified polyvinyl acetal resin. The process comprises reacting a polyvinyl acetal resin derived from polyvinyl alcohol and 4-hydroxybutanal with a carboxylic acid derivative selected from the group consisting of carboxylic acids, esters, anhydrides, and acid halides. Preferably, the carboxylic acid derivative is derived from a $C_2$–$C_{30}$ aliphatic or aromatic carboxylic acid. Particularly preferred are carboxylic acid derivatives that have the formula $R(CO)X$ in which R is a $C_4$–$C_{10}$ alkyl group, and X is selected from the group consisting of hydroxy, alkoxy, acetoxy, chloride, and bromide. Generally, it is preferred to use enough of the carboxylic acid derivative to convert most of the primary hydroxyl end groups to ester groups.

The esterified compositions produced by this process are "internally plasticized" compositions, i.e., they require no added plasticizer. Since the plasticizer is built into the resin, it cannot phase separate from the resin. The plasticizing moieties are permanently and evenly distributed throughout the resin. As a result, a relatively high level of acetal resin physical properties can be anticipated. Interestingly, we found that the plasticizing effect is much more pronounced when polyvinyl acetal resins based on 4-hydroxybutanal are esterified compared with esterified polyvinyl butyral (see results in Table 3).

The plasticized polyvinyl acetal compositions, polymer blends, and esterified polyvinyl acetal compositions of the invention are expected to show advantages in numerous practical applications. These include, but are not limited to, primers and surface coatings for wood, metal, plastic, and other substrates; wood sealers; adhesives, especially for metals; caulking compounds; magnet wire insulation; fibers; synthetic leathers; foams and sponges; binders in ceramic processing, inks, dielectric coatings, photoconductive coatings, copy machine toners and transfer printing dyes; water- and stain-proofing agents for textiles; coatings for heat-sensitive paper; carriers for slow release of drugs, insecticides, herbicides, and bacteriocides; property-enhancing additives for other resins such as urea-formaldehydes, melamine-formaldehydes, phenolics, epoxies, urethanes, and polyesters.

The following examples merely illustrate the invention. Those skilled in the art will recognize numerous variations that are within the spirit of the invention and scope of the claims.

EXAMPLE 1

Preparation of Polyvinylacetal Resin Based on 4-Hydroxybutanal (PVHB)

Polyvinyl alcohol (300 grams of 99% hydrolyzed product having $M_n = 50,000$), sulfuric acid (7.2 g), p-toluenesulfonic acid monohydrate (16.8 g), and absolute ethanol (5.0 L) are charged to a 12-L round-bottom flask equipped with a mechanical stirrer, addition funnel, reflux condenser, and nitrogen inlet. The mixture is heated to 70° C., and aqueous 4-hydroxybutanal/3-hydroxy-2-methylpropanal (HBA/HMPA=7:1) mixture (2.16 L of 12–15 wt. % aldehyde solution) is added over 2.5 h. The mixture is heated for 2 more hours, and is then cooled. The reaction product is combined in a blender with an equal volume of warm, saturated aqueous sodium bicarbonate solution, and the neutralized polymer product precipitates. The product is washed with de-ionized water. Excess water is removed by mixing the polymer in the blender with acetone. The product, a white solid, is dried in a vacuum oven at 50° C. The product has a $T_g = 83°$ C. Analysis by $^{13}$C NMR and infrared spectroscopies reveals the presence of acetal groups and primary hydroxyl groups. Unreacted vinyl alcohol group content=18 wt. %.

EXAMPLES 2–10

Plasticization of PVHB with Glycols, Ethers, and Polyols

Finely ground PVHB (from Example 1, 100 g) is dissolved in ethanol (400 g). A glycol, ether, or polyether polyol plasticizer (see Table 1 for identity and amount) is added, and the mixture is stirred well. Volatile materials are stripped at reduced pressure, and the residue is dried in a vacuum oven, typically to give a rubbery solid. Glass-transition temperatures appear in Table 1. The materials are compression molded into 0.03"-thick films for testing. The films are generally flexible, clear, and non-greasy.

COMPARATIVE EXAMPLES 11–13

Plasticization of PVHB with Esters

The procedure of Examples 2–10 is followed with the aliphatic ester plasticizers commonly used to plasticize polyvinyl butyral. The glass-transition temperatures (Table 1) are generally higher than desirable. The compression-molded films are typically hard, stiff, and have a marbled, greasy surface.

EXAMPLE 14

Preparation of Polyvinyl Co-acetal Resin Based on 4-Hydroxybutanal and n-Butyraldehyde (PVB/PVHB) Low n-Butyraldehyde Content Polyvinyl alcohol (300 grams of 99% hydrolyzed product having $M_n=50,000$), sulfuric acid (7.2 g), p-toluenesulfonic acid monohydrate (16.8 g), and distilled water (3.5 L) are charged to a 12-L round-bottom flask equipped as in Example 1. n-Butyraldehyde (72 g) is added to 1.54 L of an aqueous 4-hydroxybutanal/3-hydroxy-2-methylpropanal (HBA/HMPA=7:1) mixture (12–15 wt. % aldehyde solution), and ethanol (400 mL) is added to give a homogeneous solution. The mixture of polyvinyl alcohol and acids in water is heated to 70° C. until the polyvinyl alcohol dissolves, and then the mixed aldehyde solution is added over 2.5 h. During the addition, 100–200 mL of ethanol is added for every 500 mL of aldehyde solution to maintain a homogeneous reaction mixture. After the addition is complete, the mixture is heated for 2 more hours, and is then cooled. The reaction product is neutralized, precipitated, washed, and dried as described in Example 1. The product has a $T_g=84°$ C. Analysis by $^{13}$C NMR and infrared spectroscopies reveals the presence of primary hydroxyl groups and acetal groups derived from both 4-hydroxybutanal and n-butyraldehyde. Of the acetal groups, 60 mole % are derived from n-butyraldehyde. Unreacted vinyl alcohol group content=17 wt. %.

EXAMPLES 15–18

Plasticization of Polyvinyl Co-acetal Resin (PVB/PVHB) with Glycols or Glycol/Ester Mixtures A finely ground sample of the co-acetal resin of Example 14 (100 g) is dissolved in ethanol (400 g), a plasticizer is added (see Table 2 for identity and amount), and the solution is mixed well. Volatile materials are removed at reduced pressure, and the residue is dried in a vacuum oven. Glass-transition temperatures appear in Table 2. The rubbery solids are compression molded into flexible, non-greasy, optically clear, 0.03"-thick films.

COMPARATIVE EXAMPLE 19

Plasticization of Polyvinyl Co-acetal Resin (PVB/PVHB) with Tetraethylene Glycol Diheptanoate The procedure of Examples 15–18 is followed, except that only tetraethylene glycol diheptanoate is used as a plasticizer. The product is rubbery with a $T_g=26°$ C. However, attempted compression molding results in phase separation, and gives a stiff, marbled, greasy film.

EXAMPLE 20

Preparation of Polyvinyl Co-acetal Resin Based on 4-Hydroxybutanal and n-Butyraldehyde (PVB/PVHB) High n-Butyraldehyde Content The procedure of Example 14 is followed, except that 166 g of n-butyraldehyde and 533 mL of the 4-hydroxybutanal/3-hydroxy-2-methylpropanal solution are used. The resulting co-acetal product is a white solid ($T_g=84°$ C.). Unreacted vinyl alcohol groups: 22 wt. %; acetal groups derived from n-butyraldehyde: 85 mole %.

EXAMPLE 21

Plasticization of Polyvinyl Co-acetal Resin (PVB/PVHB) with a Glycol/Ester Mixture A finely ground sample of the co-acetal resin of Example 20 (100 g) is dissolved in ethanol (400 g), a mixture of tetraethylene glycol (17.6 g) and tetraethylene glycol diheptanoate (17.6 g) is added, and the solution is mixed well. Volatile materials are removed at reduced pressure, and the residue is dried in a vacuum oven. The resulting rubbery solid ($T_g=11°$ C.) is compression molded into flexible, non-greasy, optically clear, 0.03"-thick films.

COMPARATIVE EXAMPLE 22

Plasticization of Polyvinyl Co-acetal Resin (PVB/PVHB) with Tetraethylene Glycol Diheptanoate The procedure of Example 21 is followed, except that only tetraethylene glycol diheptanoate (42.8 g) is used as the plasticizer. The product obtained is rubbery and has a $T_g$ of 21° C. Attempts to compression mold the product result in phase separation and give a stiff, greasy, marbled film.

EXAMPLE 23

Internal Plasticization of Polyvinyl Co-acetal Resin (PVB/PVHB) by Esterification with Heptanoyl Chloride A finely ground sample of the co-acetal resin of Example 14 (8.4 g) is slurried in toluene (45 g) and heated to 60° C. Heptanoyl chloride (8.84 g) is added over 0.5 h, during which time the polymer dissolves. After addition is complete, the mixture is stirred for another 2 h at 60° C. After cooling, methanol is added to quench any unreacted acid chloride and precipitate the product. The product is washed with methanol and dried. Infrared spectrum: strong ester carbonyl stretch; very weak hydroxyl stretch. $^{13}C$ NMR spectrum shows evidence of ester and acetal carbons, but no evidence of unreacted —CH$_2$OH groups. Physical properties of the co-acetal resin from Example 14 and the esterified resin of this example are compared in Table 3.

EXAMPLE 24

Internal Plasticization of Polyvinyl(4-hydroxybutanal) (PVHB) by Esterification with Heptanoyl Chloride Polyvinyl(4-hydroxybutanal) from Example 1 (10 g) is reacted with heptanoyl chloride (10.3 g) using the procedure of Example 23. Analysis by infrared and $^{13}C$ NMR spectroscopies indicates the presence of acetal and ester groups. Physical properties of the acetal resin of Example 1 and the esterified resin of this example are compared in Table 3.

COMPARATIVE EXAMPLE 25

Internal Plasticization of Polyvinyl Butyral by Esterification with Heptanoyl Chloride Butvar ® B-98 polyvinyl butyral (product of Monsanto, 10 g) is reacted with heptanoyl chloride using the procedure of Example 23. Physical properties of the unmodified polyvinyl butyral acetal resin and the esterified product of this example are compared in Table 3.

EXAMPLES 26–30

Miscible Polymer Blends: Polyvinyl(4-hydroxybutanal) Blended with Polyvinylpyrrolidone Polyvinyl(4-hydroxybutanal) (PVHB) prepared as in Example 1 ($T_g=83°$ C.) and polyvinylpyrrolidone ($M_n=370,000$; $T_g=163°$ C.) are solution blended in ethanol, and the solutions are cast to give optically clear, thin films. The films show a single composition-dependent $T_g$, indicating that the blends are compatible over the composition range studied. The expected $T_g$ is calculated from $T_g=T_{g1}(w_1)+T_{g2}(w_2)$, where $T_{g1}$ is the $T_g$ of PVHB, $T_{g2}$ is the $T_g$ of polyvinylpyrrolidone, and $w_1$ and $w_2$ are the weight percentages of PVHB and polyvinylpyrrolidone in the blend. The calculated $T_g$'s and actual values for a number of blends are compared in Table 5.

The preceding examples are meant only as illustrations; the true scope of the invention is defined by the following claims.

TABLE 1

Plasticization of Polyvinyl(4-hydroxybutanal) (PVHB)

| Example* | Plasticizer | Wt. % | $T_g$ (°C.) |
|---|---|---|---|
| 1 | none | 0 | 83 |
| 2 | tetraethylene glycol (TEG) | 30 | 11 |
| 3 | tetraethylene glycol (TEG) | 23 | 23 |
| 4 | tripropylene glycol (TPG) | 30 | 19 |
| 5 | tripropylene glycol (TPG) | 23 | 25 |
| 6 | dipropylene glycol (DPC) | 30 | 21 |
| 7 | polytetrahydrofuran diol (250 mw) | 30 | 29 |
| 8 | polytetrahydrofuran diol (650 mw) | 30 | 74 |
| 9 | tetraethylene glycol dimethyl ether | 23 | 46 |
| 10 | tetraethylene glycol dimethyl ether | 30 | 35 |
| C11 | dihexyl adipate | 30 | 63 |
| C12 | dibutyl sebacate | 30 | 65 |
| C13 | dimethyl adipate | 30 | 56 |

*Compression-molded films are flexible, clear, and non-greasy except for Comparative Examples 11–13, which are hard, marbled, and greasy.
C—indicates comparative example

TABLE 2

Plasticization of Polyvinyl Co-acetal Resin (PVB/PVHB) with Glycols and Glycol/Ester Mixtures

| Example* | Plasticizer | Wt. % | $T_g$ (°C.) |
|---|---|---|---|
| 14 | none | 0 | 84 |
| 15 | tetraethylene glycol (TEG) | 30 | 56 |
| 16 | tripropylene glycol/TEG-DH | 15/15 | 30 |
| 17 | TEG/TEG-DH | 5/25 | 30 |
| 18 | TEG/TEG-DH | 15/15 | 16 |
| C19 | TEG-DH | 30 | 26 |

TEG-DH = tetraethylene glycol diheptanoate
*Compression-molded films are flexible, clear, and non-greasy except for Comparative Examples 19, which is hard, marbled, and greasy.
C—indicates comparative example

TABLE 3

Effect of Esterification of Polyvinyl Acetal Resins on Glass-Transition Temperature

| Resin | $T_g$ (°C.) | Wt. % OH Groups |
|---|---|---|
| Polyvinyl butyral (PVB) (Butvar ® B-98)* | 73 | 7.3 |
| Esterified PVB (see Example 25) | 47 | 4.4 |
| Polyvinyl(4-hydroxybutanal) (PVHB) (Ex. 1) | 83 | 19 |
| Esterified PVHB (see Example 24) | −6 | 8.8 |
| Polyvinyl Co-acetal from 4-hydroxybutanal and n-butyraldehyde (PVB/PVHB) (Ex. 14) | 84 | 13 |
| Esterified PVB/PVHB Co-acetal (see Ex. 23) | 4 | 2.1 |

*Butvar ® B-98, a product of Monsanto Company, is unplasticized polyvinyl butyral resin.

TABLE 4

Physical Properties of Plasticized Polyvinyl Acetal Resins

| Resin | Plasticizer | Tear Strength (lb/in) | Tensile Str. (psi) | Elong. % |
|---|---|---|---|---|
| Butacite ® PVB* | TEG-DH | 230 | 3230 | 250 |
| PVHB (Ex. 2) | TEG | — | 4980 | 180 |
| PVHB (Ex. 4) | TPG | 370 | 4700 | 190 |
| PVB/PVHB (Ex. 18) | TEG/TEG-DH | 590 | 4230 | 170 |

*Butacite ® PVB, a product of DuPont, is a plasticized polyvinyl butyral resin containing tetraethylene glycol diheptanoate as a plasticizer.
PVHB = polyvinyl(4-hydroxybutanal); PVB/PVHB = co-acetal resin derived from 4-hydroxybutanal and n-butyraldehyde
TEG = tetraethylene glycol; TPG = tripropylene glycol; TEG-DH = tetraethylene glycol diheptanoate
Tests performed on 0.031″ - thick compression-molded films

TABLE 5

Glass-Transition Temperatures of PVHB, Polyvinylpyrrolidone, and Blends of These

| Example No. | Composition, wt. % PVHB/PVP | Experimental $T_g$ (°C.) | Calculated $T_g$ (°C.) |
|---|---|---|---|
| 26 | 100/0 | 83 | |
| 27 | 80/20 | 98 | 99 |
| 28 | 50/50 | 124 | 123 |
| 29 | 20/80 | 152 | 147 |
| 30 | 0/100 | 163 | |

PVHP = polyvinyl (4-hydroxybutanal); PVP = polyvinylpyrrolidone

We claim:

1. A laminar structure comprising:
   (a) a first layer of a glazing material selected from the group consisting of glass, polycarbonate, polyurethane, polyacrylate, polyester, polyamide, polyether, and polyacetal; and
   (b) a second layer of a plasticized polyvinyl acetal resin, wherein the polyvinyl acetal resin is derived from polyvinyl alcohol and 4-hydroxybutanal.

2. The laminar structure of claim 1 wherein the structure comprises two layers of glass and an interlayer of the plasticized polyvinyl acetal resin.

3. The laminar structure of claim 1 wherein the structure comprises two layers of glass and an interlayer of a plasticized polyvinyl acetal resin derived from polyvinyl alcohol, 4-hydroxybutanal, and 3-hydroxy-2-methylpropanal.

4. The laminar structure of claim 1 wherein the first layer of glazing material is a polyurethane.

5. The laminar structure of claim 1 wherein the second layer contains a plasticizer selected from the group consisting of $C_2-C_{30}$ aliphatic mono-, di-, and polyfunctional alcohols, ethers, and glycol ethers; polyoxyalkylene polyols; and ethers derived from polyoxyalkylene polyols.

6. A polymer blend comprising:
   (a) a polyvinyl acetal resin derived from polyvinyl alcohol and 4-hydroxybutanal; and
   (b) a polymer selected from the group consisting of polyurethanes, polyacrylates, polycarbonates, polyesters, polyamides, polyethers, polyvinylpyrrolidones, and polyacetals.

7. The polymer blend of claim 6 wherein the polyvinyl acetal resin contains a plasticizer selected from the group consisting of $C_2-C_{30}$ aliphatic mono-, di-, and polyfunctional alcohols, ethers, and glycol ethers; polyoxyalkylene polyols; and ethers derived from polyoxyalkylene polyols.

8. The polymer blend of claim 6 wherein the polyvinyl acetal resin is derived from polyvinyl alcohol, 4-hydroxybutanal, and 3-hydroxy-2-methylpropanal.

9. A laminar structure comprising:
   (a) a first layer of a glazing material selected from the group consisting of glass, polycarbonate, polyurethane, polyacrylate, polyester, polyamide, polyether, and polyacetal; and
   (b) a second layer, wherein the second layer is a miscible blend of:
      (i) a plasticized polyvinyl acetal resin derived from polyvinyl alcohol and 4-hydroxybutanal; and
      (ii) a polymer selected from the group consisting of polyurethanes, polyacrylates, polycarbonates, polyesters, polyamides, polyethers, polyvinylpyrrolidones, and polyacetals.

10. The laminar structure of claim 9 wherein the structure comprises two layers of glass and an interlayer of the miscible blend.

11. The laminar structure of claim 9 wherein the first layer of glazing material is a polyurethane.

12. The laminar structure of claim 9 wherein the second layer contains a plasticizer selected from the group consisting of $C_2-C_{30}$ aliphatic mono-, di-, and polyfunctional alcohols, ethers, and glycol ethers; polyoxyalkylene polyols; and ethers derived from polyoxyalkylene polyols.

13. A process for making a plasticized polyvinyl acetal resin, said process comprising:
   (a) reacting an aqueous solution that contains 4-hydroxybutanal with polyvinyl alcohol in the presence of an acid catalyst to produce a polyvinyl acetal resin;
   (b) combining the polyvinyl acetal resin with a plasticizer selected from the group consisting of $C_2-C_{30}$ aliphatic mono-, di- and polyfunctional alcohols, ethers, and glycol ethers; polyoxyalkylene polyols; and ethers derived from polyoxyalkylene polyols; to form the plasticized polyvinyl acetal resin.

14. The process of claim 13 wherein the aqueous solution contains 4-hydroxybutanal and 3-hydroxy-2-methylpropanal.

15. The process of claim 13 wherein the acid catalyst is selected from the group consisting of mineral acids, organic acids, acidic ion-exchange resins, acidic clays, and mixtures thereof.

16. The process of claim 13 wherein the process is performed at a temperature within the range of about 20° C. to about 100° C.

17. A process for making an esterified polyvinyl acetal resin, said process comprising reacting a polyvinyl acetal resin derived from polyvinyl alcohol and 4-hydroxybutanal with a carboxylic acid derivative selected from the group consisting of carboxylic acids, esters, anhydrides, and acid halides.

18. The process of claim 17 wherein the carboxylic acid derivative has the formula R(CO)X in which R is a $C_4-C_{10}$ alkyl group, and X is selected from the group consisting of hydroxy, alkoxy, acetoxy, chloride, and bromide.

19. An esterified polyvinyl acetal resin made by the process of claim 17.

* * * * *